Figure 1:
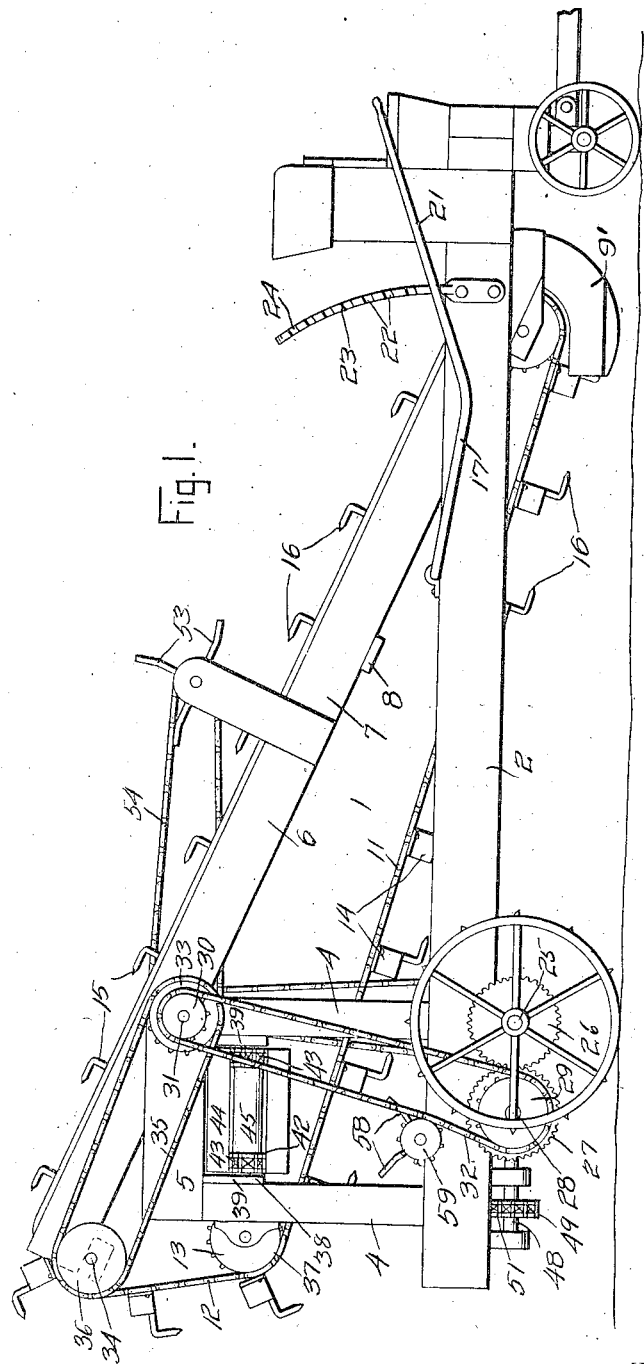

J. DOLMAN.
POTATO GATHERING MACHINE.
APPLICATION FILED APR. 27, 1908.

909,375.

Patented Jan. 12, 1909.
5 SHEETS—SHEET 1.

Witnesses
C. K. Keichenbach.
C. H. Griesbauer.

Inventor
J. Dolman
By H. R. Willson & Co.
Attorneys

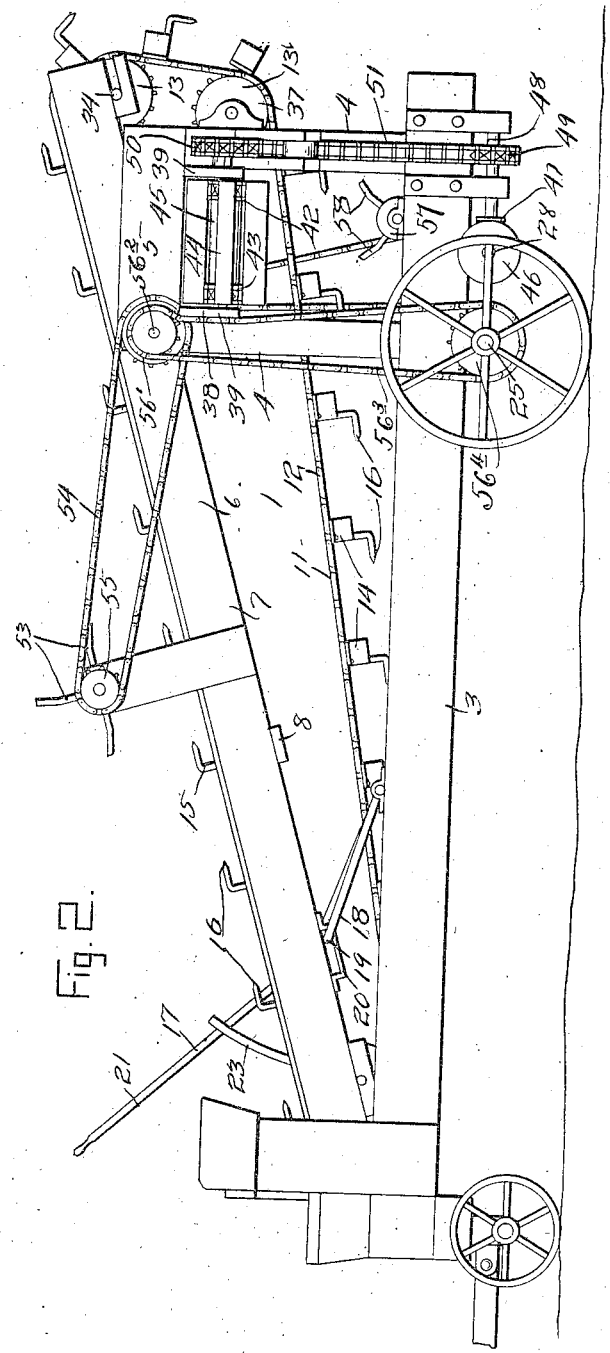

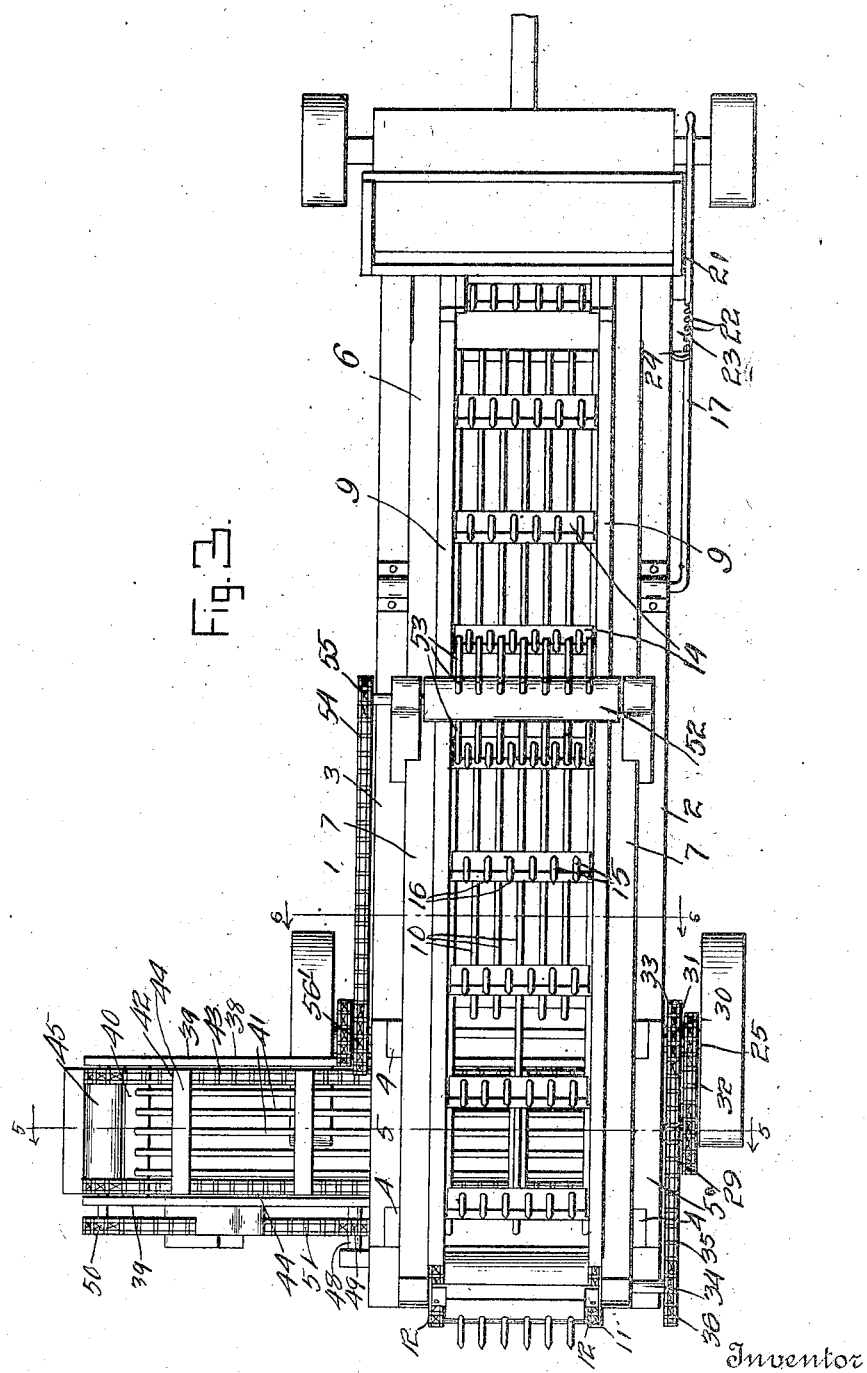

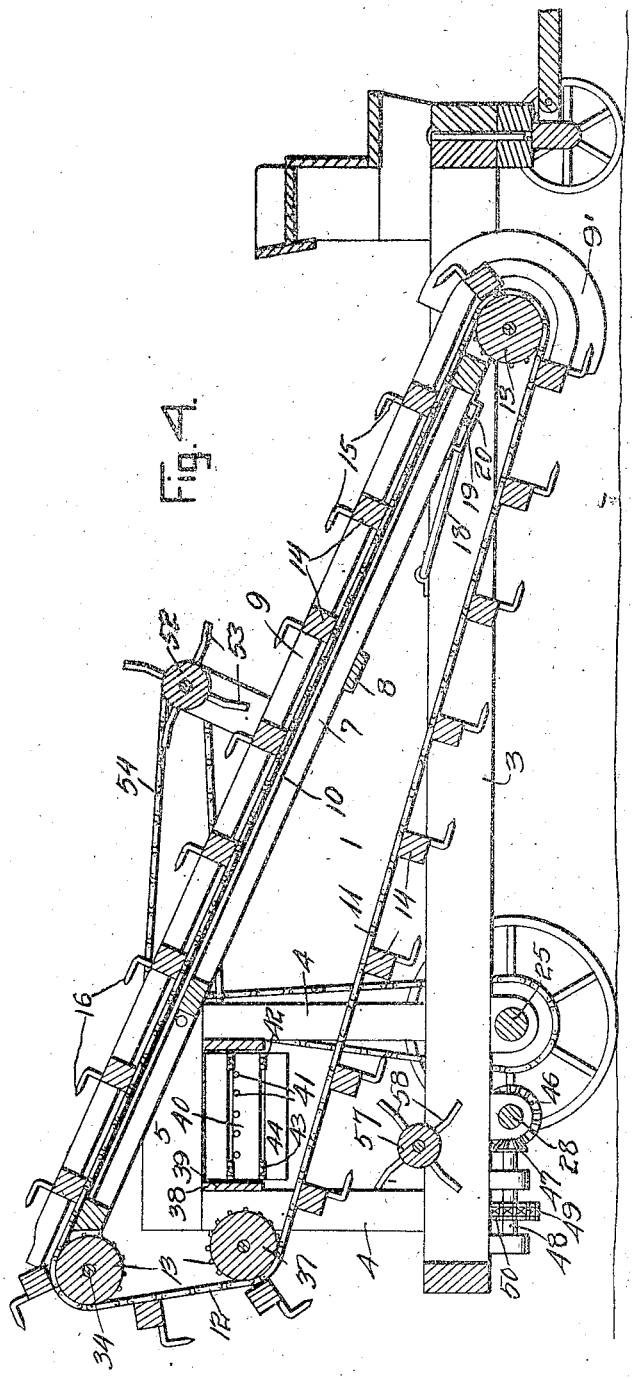

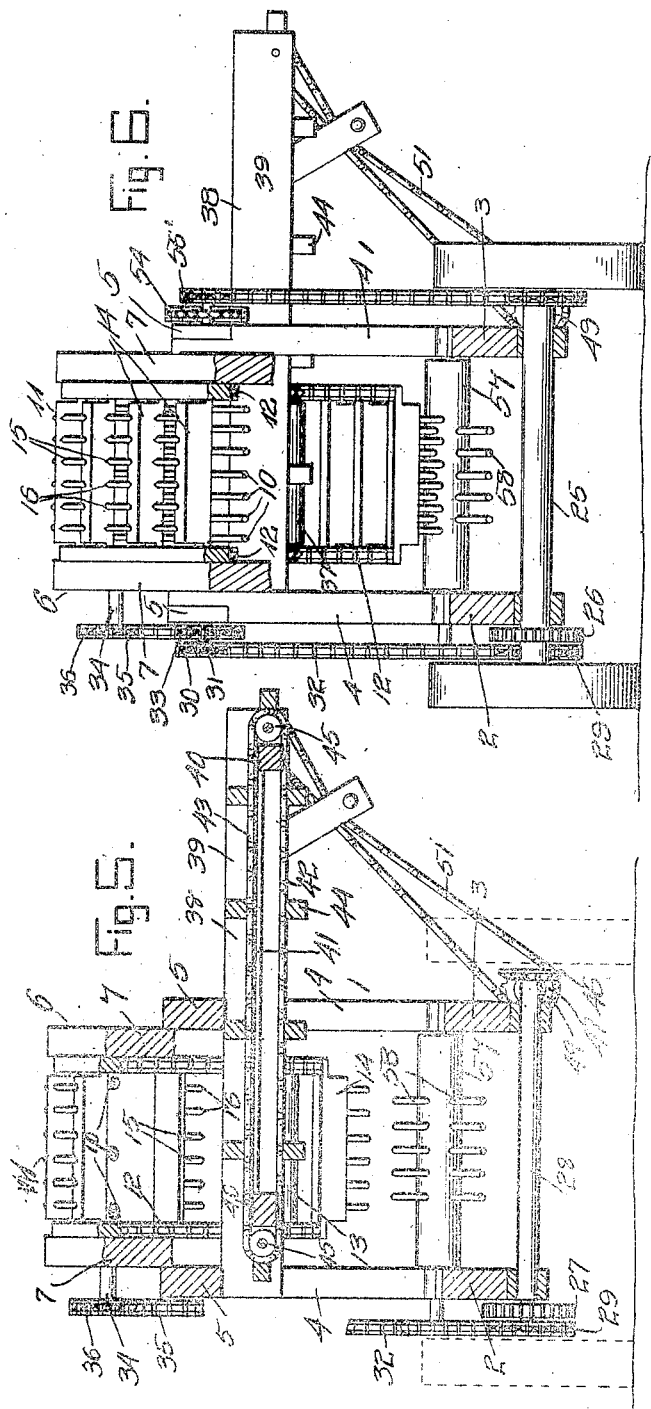

UNITED STATES PATENT OFFICE.

JOSEPH DOLMAN, OF WESTVILLE, INDIANA.

POTATO-GATHERING MACHINE.

No. 909,375.  Specification of Letters Patent.  Patented Jan. 12, 1909.

Application filed April 27, 1908. Serial No. 429,441.

*To all whom it may concern:*

Be it known that I, JOSEPH DOLMAN, a citizen of the United States, residing at Westville, in the county of Laporte and State of Indiana, have invented certain new and useful Improvements in Potato-Gathering Machines; and I do declare the following to be a full, clear, and exact description of the invention, such as will enable others skilled in the art to which it appertains to make and use the same.

This invention relates to new and useful improvements in potato gathering machines and has for its object the production of a simple and efficiently operating device of this kind by means of which potatoes may be gathered from the ground and conveyed to a wagon in an expeditious manner and with a minimum of labor.

With this and other objects in view, the invention consists of certain novel features of construction, combination and arrangement of parts, as will be more fully described and particularly pointed out in the appended claims.

In the accompanying drawings, Figure 1 represents a side elevation of a machine embodying my improvements, looking from one side of the machine; Fig. 2 is a similar view looking from the opposite side of the machine, with parts broken away and the front end of the elevator raised; Fig. 3 is a plan view; Fig. 4 is a central longitudinal vertical sectional view; Fig. 5 is a cross sectional view taken on line 5—5 of Fig. 3; and Fig. 6 is a similar view, taken on line 6—6 of Fig. 3.

In the embodiment illustrated, the numeral 1 indicates the machine body which is mounted upon suitable supporting wheels, said frame as shown, consisting of side cross pieces 2 and 3 respectively. An upright supporting structure is mounted upon the rear end of the machine body. As shown, said structure consists of a pair of upright longitudinally spaced supports 4 which are arranged at each side of the machine and are connected by longitudinally extending top pieces 5, it being evident however that this construction is not necessarily resorted to.

In carrying out the invention an elevator supporting frame 6 which extends the full length of the machine and is inclined rearwardly and upwardly, is pivotally mounted between the top pieces 5 of the supporting structure. As shown, said elevator frame comprises side pieces 7 and cross pieces 8, the latter of which support a floor consisting of a series of longitudinally extending spaced wires or rods 10 a number of which extend the full length of the frame and the remaining wires or rods to the cross piece of the frame located at the pivotal point thereof.

An endless elevator 11 is arranged in the supporting frame 6, said elevator, as shown, consisting of sprocket chains 12, and a series of longitudinally spaced cross pieces 14, the sprocket chains running over the toothed drums 13, suitably mounted between the side pieces of the supporting frame. Longitudinally extending guard strips 9 are arranged over the sprocket chains of the carrier, the front ends of said strips terminating in rearwardly curved runners 9' which ride over the surface of the ground.

In carrying out the invention each of the cross pieces 14 of the elevator is provided with a series of transversely spaced gathering fingers 15 which are bent inwardly approximately at right angles to form tooth portions 16 which are adapted to enter the ground beneath the potatoes and elevate them upon the floor of the elevator frame.

A particular feature of the invention resides in the provision of manually operated means for adjusting the front end of the elevator frame to suit the surface of the ground. This is accomplished by an operating lever 17 a portion of which is bent to form a forwardly extending crank 18 the side pieces of which extend in parallel relation with the elevator frame and the cross piece 19 of which is connected with the under edges of the side pieces 7 of the supporting frame 6 by longitudinally extending keeper plates 20. The remaining portion of said operating lever terminates in a forwardly extending handle 21 the free end of which may be engaged with either of a series of notches or recesses 22 formed in the outer face of an upright 23 arranged at the front end of the machine body. By this construction it will be readily perceived that by raising or lowering the handle portion of the operating lever the front end of the elevator frame may be raised or lowered to any desired extent to suit the surface of the ground. The upright 23 is also preferably provided with a notch or recess 24 at its extreme upper end for the reception of the handle portion of the operating lever in the event of the operator desiring to raise the front end of the elevator to a considerable extent above the surface of the ground as in moving the machine from place to place.

While various arrangements of gearing may be resorted to for driving the elevator, I have shown and will proceed to describe an arrangement that I prefer to employ in connection with the invention.

The main axle 25 is provided at one end with a suitable gear wheel 26 which intermeshes with a second gear wheel 27 fixed to one end of a counter-shaft 28 mounted beneath the machine body. This counter-shaft is also provided with a sprocket wheel 29 over which and a second sprocket wheel 30 fixed to the extreme outer end of a stub shaft 31 mounted in one of the top pieces 5 is arranged to extend a drive sprocket chain 32. The stub shaft 31 is also provided with a second sprocket wheel 33 by means of which communication is imparted to a transversely extending shaft 34 through the medium of a sprocket chain 35 running over the wheel 33 and a suitable sprocket wheel 36 fixed to the adjacent end of said shaft 34.

A toothed drum 37 is mounted between the rear supports 4 and serves as a guide for the sprocket chains it being evident however, that this last mentioned drum may be dispensed with if desired.

One end of a laterally extending carrier frame 38 is mounted between the upright supports 4 of the supporting structure the opposite end of which projects a suitable distance from one side of the machine, the purpose of which will be described. As shown, this frame consists of side and cross pieces 39 and 40 respectively and a floor composed of a number of longitudinally extending spaced wires or rods 41 which are supported by and connected with the cross pieces. An endless carrier 42 is arranged in said carrier frame, said carrier consisting of sprocket chains 43 connected by a series of longitudinally spaced cross pieces 44, the sprocket chains running over suitable toothed drums or cylinders 45 mounted between the side pieces and at opposite ends of the carrier frame.

The following is a brief description of the gearing which is employed for driving the carrier; one end of the counter-shaft 28 is provided with a bevel gear 46 which intermeshes with a bevel pinion 47 arranged at the front end of a longitudinally extending shaft 48, to the intermediate portion of which is keyed or otherwise fixed a sprocket wheel 49 over which and a second wheel 50 fixed to one end of one of the drums 45 is arranged a drive sprocket chain 51.

A drum 52 is suitably mounted at a suitable point above the elevator frame, said drum being provided with four or more transverse series of radially projecting spaced fingers 53 which are so positioned as to pass between the toothed portions 16 of the gathering fingers 15 and serve to separate the potato vines or other debris therefrom. This drum is driven by a sprocket chain 54 which passes over a suitable sprocket wheel 55 fixed to one end of the drum shaft and over a second sprocket wheel $56'$ fixed to the stub shaft $56^2$, motion being communicated to said stub shaft by a sprocket chain $56^3$ passing over a suitable sprocket wheel $56^4$, fixed to one end of the main axle 25. A second drum 57 provided with four or more series of fingers 58 is mounted upon the side pieces of the machine body in rear of the drum 52, the former serving to remove any vines or other debris from the gathering fingers that may be still retained thereby after passing the latter. Said drum 57 is driven by a sprocket wheel 59 which intermeshes with the sprocket chain 32.

In the operation of the device the front end of the elevator frame is properly adjusted to suit the surface of the ground by the means heretofore described and the machine driven astride the rows of potatoes. As the machine is driven forward the gathering fingers gradually approach the ground until having reached the front end of the machine when each of the respective series of fingers penetrates into the ground to a distance of three or more inches and gathers the potatoes therefrom and conveys them to the floor of the elevator frame upon which they are dumped and carried by the cross pieces 14 of the elevator to the carrier, the wires or rods constituting the floor of the elevator frame being sufficiently spaced apart at the extreme end of the elevator frame as heretofore described to permit the potatoes to fall between the same upon the carrier by means of which they are conveyed to a wagon which may be driven alongside of the machine.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new is:

1. In a machine of the character described the combination with the machine body, of an upright supporting structure mounted at the rear thereof, a rearwardly and upwardly inclined carrier frame pivotally mounted upon the supporting structure, said frame comprising side pieces provided at their front ends with rearwardly curved runners adapted to ride over the surface of the ground, manually operated means for adjusting the front end of the elevator frame vertically and an endless carrier arranged in said frame.

2. In a machine of the character described, the combination with the machine frame, of an upright support fixedly mounted thereon, a longitudinally disposed carrier frame pivotally mounted upon said support and provided at its front end with rearwardly curved runners, an endless carrier arranged in said frame, a transverse carrier arranged beneath the rear end of said longitudinally disposed carrier frame, means for driving the carriers from the main axle, and means under the control of the operator for adjusting the front end of the longitudinally disposed carrier frame vertically.

In testimony whereof I have hereunto set my hand in presence of two subscribing witnesses.

JOSEPH DOLMAN.

Witnesses:
 E. A. KALIES,
 B. H. STEWART.